UNITED STATES PATENT OFFICE.

ALBERT DECATUR BARR, OF BATESVILLE, ARKANSAS.

MEDICAMENT AND PROCESS OF PRODUCING THE SAME.

1,005,137. Specification of Letters Patent. Patented Oct. 10, 1911.

No Drawing. Application filed December 28, 1910. Serial No. 599,702.

*To all whom it may concern:*

Be it known that I, ALBERT DECATUR BARR, a citizen of the United States, residing at Batesville, county of Independence, State of Arkansas, have invented new and useful Improvements in Medicaments and Processes of Producing the Same, of which the following is a specification.

This invention relates to medicaments and processes of making the same and it comprises a new and useful compound of quinin and a nitrophenol which is a valuable intestinal antiseptic, and the process of making such compound, all as more fully hereinafter set forth and as claimed.

The value of quinin and of nitrophenols as antiseptics is known. But the fact that no form of quinin or of a nitrophenol which is not absorbed from the stomach has been available has been an obstacle to the satisfactory use of either of them as intestinal antiseptics.

The object of the present invention is to combine quinin and a nitrophenol into a compound of such a nature that neither the quinin nor the nitrophenol will be absorbed from the stomach but will pass beyond and act to the best advantage in the intestines.

The product of my invention is accordingly particularly valuable as a disinfectant of the alimentary canal in diseases such as dysentery, typhoid fever and the like, in which an effective antiseptic is desired.

In a typical embodiment of my invention recited in the illustrative formula hereinafter contained, I use a mononitrophenol, but it will be understood that I may use other forms of the various phenols, that is phenols carrying one or more substituent nitro groups. Of the nitrophenols, paranitrophenol is best adapted for the purposes of the present invention, though other nitrophenols may also be employed to advantage in certain cases. Metanitrophenol is not so suitable.

The following illustrative formula sets forth the method employed to secure the compound:—To 2.7194 ounces (troy) of quinin 3 ounces of water are added, the whole placed over a water bath and raised to a temperature of 100° C. When all the quinin that the water will contain is in solution and the residue melted, 1 ounce (troy) of paranitrophenol is added, the whole being maintained at a temperature of 100° C. and stirred. The quinin and paranitrophenol will unite and produce an insoluble, crystalline compound. Upon evaporation to dryness, a yellowish-brown neutral salt will result.

The reaction takes place according to the following formula:

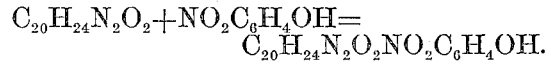
$$C_{20}H_{24}N_2O_2 + NO_2C_6H_4OH = C_{20}H_{24}N_2O_2NO_2C_6H_4OH.$$

The percentage analysis of the product is substantially 73.114— quinin and 26.886— mononitrophenol.

The compound is almost wholly insoluble in water or dilute acids and thus passes through the stomach without being absorbed. It is decomposed in the intestines into quinin and mononitrophenol, both of which are valuable intestinal antiseptics.

I claim:—

1. As a new composition of matter, a compound of quinin and a mononitrophenol, said compound being almost wholly insoluble in water or dilute acids and possessing antiseptic properties.

2. As a new composition of matter, an intestinal antiseptic containing substantially 73.114—% quinin and substantially 26.886+% mononitrophenol, said composition being almost wholly insoluble in water or dilute acids and possessing antiseptic properties.

3. The process of making a medicament which comprises adding water to quinin, bringing the temperature thereof to about 100° C., adding a mononitrophenol when part of the quinin is in solution and stirring the mixture at about said temperature until combination between the quinin and the mononitrophenol is effected.

4. The process of making an intestinal antiseptic which comprises mixing quinin with water, keeping the temperature of the mixture at about 100° C., and while the mixture is at that temperature adding a mononitrophenol to combine with the quinin.

5. As a new composition of matter, a compound of quinin and a nitrophenol, said compound being relatively insoluble in water or dilute acids, and possessing antiseptic properties.

6. As a new composition of matter, a compound of quinin and paranitrophenol, said compound being relatively insoluble in water or dilute acids, and possessing antiseptic properties.

7. The process of making a medicament which comprises treating a mixture of quinin and a nitrophenol under suitable reacting conditions, to produce combination thereof.

8. The process of making a medicament which comprises mixing quinin and paranitrophenol in the presence of water, and gently heating the mixture to produce combination between the quinin and the paranitrophenol.

ALBERT DECATUR BARR.

Witnesses:
GEO. L. BEVENS,
W. J. WARD.